UNITED STATES PATENT OFFICE.

WILLIAM N. TAGGART, OF PHILADELPHIA, PENNSYLVANIA, ASSIGNOR OF ONE-HALF TO HENRY C. MEYERS, OF SAME PLACE.

METHOD OF CONVERTING CAST-IRON INTO STEEL.

SPECIFICATION forming part of Letters Patent No. 525,296, dated August 28, 1894.

Application filed May 8, 1894. Serial No. 510,542. (No specimens.)

*To all whom it may concern:*

Be it known that I, WILLIAM N. TAGGART, a citizen of the United States, residing in Philadelphia, Pennsylvania, have invented certain Improvements in Methods of Converting Cast-Iron into Steel, of which the following is a specification.

The object of my invention is to effect, by a simple process and economical means, the rapid conversion of cast iron into steel of fine quality, capable of being tempered and available for the manufacture of various forms of cutting tools or for other purposes where an extremely hard metal is desired. This object I attain by the use of a bath composed preferably of animal oil and crude and refined petroleum, the iron or that portion of it which is to be converted, being heated to a bright red or yellow heat and being then plunged into the bath and allowed to remain therein until cool.

In preparing the bath I prefer to use the ingredients in the following proportions: animal oil, such as fish or lard oil, one pint; crude petroleum, one quart; refined petroleum, one pint.

The crude petroleum which I find best adapted for the purpose is that known in the market as "Virginia black oil" which is a crude petroleum in its natural state and is at present used largely for lubricating purposes. The refined petroleum which I employ is ordinary kerosene or illuminating oil, the use of which, however, is not absolutely necessary, although I find that better results are attained when it is used than when the animal oil is combined with crude petroleum only.

I find that ordinary gray iron castings, when highly heated and then subjected to the action of a bath such as I have described, are entirely modified in character, being toughened, hardened, and otherwise changed so as to resemble the finest tool steel, the converted metal being susceptible of receiving a high temper and being available for cutting tools or for other purposes where extreme hardness is a desideratum.

It should be understood that the bath which I employ is not a mere tempering bath, but effects an actual conversion of the iron into steel, and hence is not to be confounded with the large class of tempering compounds in which oil forms an ingredient.

Having thus described my invention, I claim and desire to secure by Letters Patent—

1. The mode herein described of converting solid bodies of cast iron into steel, said mode consisting in inserting the cast iron while highly heated, into a bath composed of animal oil and crude petroleum, substantially as specified.

2. The mode herein described of converting solid bodies of cast iron into steel, said mode consisting in heating the iron to a high temperature, and inserting it, while thus heated, into a bath composed of animal oil, crude petroleum and refined petroleum, substantially as specified.

In testimony whereof I have signed my name to this specification in the presence of two subscribing witnesses.

WILLIAM N. TAGGART.

Witnesses:
FRANK E. BECHTOLD,
JOSEPH H. KLEIN.